(12) United States Patent
Jois

(10) Patent No.: US 12,468,697 B2
(45) Date of Patent: Nov. 11, 2025

(54) SYSTEM AND METHOD OF EXECUTING, CONFIRMING AND STORING A TRANSACTION IN A SERVERLESS DECENTRALIZED NODE NETWORK

(71) Applicant: Subramanya R. Jois, Bangalore (IN)

(72) Inventor: Subramanya R. Jois, Bangalore (IN)

( * ) Notice: Subject to any disclaimer, the term of this patent is extended or adjusted under 35 U.S.C. 154(b) by 794 days.

(21) Appl. No.: 16/439,503

(22) Filed: Jun. 12, 2019

(65) Prior Publication Data

US 2020/0394183 A1 Dec. 17, 2020

(51) Int. Cl.

| | |
|---|---|
| *G06F 16/242* | (2019.01) |
| *G06F 8/30* | (2018.01) |
| *G06F 21/51* | (2013.01) |
| *G06F 21/53* | (2013.01) |
| *G06F 21/64* | (2013.01) |
| *H04L 9/06* | (2006.01) |
| *H04L 9/40* | (2022.01) |
| *H04L 9/00* | (2022.01) |

(52) U.S. Cl.
CPC .............. *G06F 16/244* (2019.01); *G06F 8/30* (2013.01); *G06F 21/51* (2013.01); *G06F 21/53* (2013.01); *G06F 21/64* (2013.01); *H04L 9/0643* (2013.01); *H04L 63/062* (2013.01); *H04L 9/50* (2022.05)

(58) Field of Classification Search
CPC .......... G06F 16/244; G06F 8/30; G06F 16/27; G06F 16/18; G06F 15/16; G06F 21/64; G06F 21/53; G06F 21/51; H04L 9/50; H04L 9/0643
USPC ........................................................ 707/737
See application file for complete search history.

(56) References Cited

U.S. PATENT DOCUMENTS 8,260,742 B2 * 9/2012 Cognigni ................ G06F 16/27
  707/624
9,596,301 B2 * 3/2017 Mosier ................ H04L 67/1095
  (Continued)

FOREIGN PATENT DOCUMENTS

| CN | 106789095 B | * 12/2020 | .......... G06F 11/0709 |
| EP | 3576368 A1 | * 12/2019 | ............. H04L 63/10 |

(Continued)

OTHER PUBLICATIONS

U.S. Appl. No. 62/778,281 (claimed for priority by Applicant), filed Dec. 11, 2018 and titled "A System and Method of Executing, Confirming and Storing a Transaction in a Serverless Decentralized Node Network With a Distributed Ledger." (Year: 2018).*

(Continued)

*Primary Examiner* — Luu T Pham
*Assistant Examiner* — Paul J Skwierawski
(74) *Attorney, Agent, or Firm* — Jose Cherson Weissbrot

(57) ABSTRACT

The present invention provides for a new Distributed Ledger Technology platform for the secure collection, analysis, storage and transfer of Messaging and Transactions, information records and related services within clusters of users to conduct Peer-to-peer message exchange and transactions using DApps while attaining network consensus using Machine State Replication and Application Layer Multicast protocol, which then is updated on the Distributed Ledger to achieve transparency, immutability and atomicity with Zero-Latency and Zero-transaction cost while providing post-quantum security.

14 Claims, 9 Drawing Sheets

(56) References Cited

U.S. PATENT DOCUMENTS

| | | | | |
|---|---|---|---|---|
| 9,967,334 | B2* | 5/2018 | Ford | H04L 41/0806 |
| 10,616,324 | B1* | 4/2020 | Kaddoura | A61F 2/4455 |
| 10,797,885 | B1* | 10/2020 | Griffin | G06F 21/64 |
| 11,354,629 | B1* | 6/2022 | Nelson | H04L 9/3239 |
| 11,356,448 | B1* | 6/2022 | Varanasi | H04L 12/4633 |
| 2008/0071853 | A1* | 3/2008 | Mosier | H04L 67/1095 |
| | | | | 709/201 |
| 2016/0261690 | A1* | 9/2016 | Ford | G06F 21/64 |
| 2018/0039667 | A1* | 2/2018 | Pierce | H04L 9/3247 |
| 2018/0349621 | A1* | 12/2018 | Schvey | H04L 63/123 |
| 2019/0014149 | A1* | 1/2019 | Cleveland | G06N 3/045 |
| 2019/0173666 | A1* | 6/2019 | Ardashev | H04L 9/0637 |
| 2019/0235946 | A1* | 8/2019 | Guo | H04L 63/0442 |
| 2020/0044827 | A1* | 2/2020 | Snow | G06Q 20/401 |
| 2021/0243028 | A1* | 8/2021 | Song | H04L 9/0825 |
| 2021/0243201 | A1* | 8/2021 | Tandel | H04L 67/1097 |

FOREIGN PATENT DOCUMENTS

| | | | | | |
|---|---|---|---|---|---|
| WO | WO-2016155496 | A1 * | 10/2016 | | G06F 11/1425 |
| WO | WO-2020121325 | A2 * | 6/2020 | | G06F 16/244 |

OTHER PUBLICATIONS

Manber, Finding Similar Files in a Large File System, Oct. 1993 (Year: 1993).*

He et al., On the Consensus Mechanisms of Blockchain/DLT for Internet of Things, (Year: 0000).*

WO2020121325A3_ISR (Year: 0000).*

"Aurigraph Real World Asset (RWA) Tokenization", Aurigraph, https://www.aurigraph.io/real-world-asset-tokenization (last accessed: Feb. 13, 2024).

Subbu Jois, "Aurigraph Protocol and Platform specification—V9", Aurigraph DLT Platform, Dec. 17, 2021.

* cited by examiner

Triple Entry Accounting

Self-Auditing Books – It's tough to lie when everyone is watching.

Alice's Books

| Debit | Credit |
|---|---|
| 5 | |
| | 2 |
| | 9 |
| 10 | |

Bob's Books

| Debit | Credit |
|---|---|
| | 5 |
| 2 | |
| 9 | |
| | 10 |

Public Book

| Alice | Bob |
|---|---|
| -5 | +5 |
| +2 | -2 |
| +9 | -9 |
| -10 | +10 |

Fig. 9

SYSTEM AND METHOD OF EXECUTING, CONFIRMING AND STORING A TRANSACTION IN A SERVERLESS DECENTRALIZED NODE NETWORK

RELATED APPLICATIONS DATA

This application claims priority under 35 U.S.C. 120 from U.S. provisional Patent Application Ser. No. 62778281, filed 11 Dec. 2018 and titled "A SYSTEM AND METHOD OF EXECUTING, CONFIRMING AND STORING A TRANSACTION IN A SERVERLESS DECENTRALIZED NODE NETWORK WITH A DISTRIBUTED LEDGER."

BACKGROUND OF THE INVENTION

1. Field of the Invention

The present invention relates generally to a system and method for manually and automated messages and information within a data sharing network. This disclosure provides for collection, storage, analysis, processing and transfer of information resources and related services between users, computers, smart phones, Smart IoT devices such as wearable devices and autonomous devices and vehicles using Decentralized Applications (DApps) and Distributed Ledger technology (DLT)-powered platform

2. Background of the Art

Distributed Ledger-based approaches have been proposed as a means of sharing information across a complex cross-institutional data infrastructure with quick Ledger reconciliations.

Unlike the present invention, however, none of the blockchain or Distributed Ledger prior art references disclose a robust, scalable, and decentralized system for collection, storage, analysis, process, reconcile and transfer of personalized information. Although blockchain technology originally provided computing functions to validate decentralized digital currency transactions, it was subsequently recognized as a general-purpose data structure that could be applied to domains such as healthcare, fintech, supply-chain and several other types of application which require messages exchanged between two compute devices without the need to go through a centralized server to centrally process and store the message or transaction where the identity of a present event is dependent on all past events. However, current blockchain platforms remain limited by poor scaling, expensive mining costs, weak interoperability interface, lack of ledger atomicity, security and consensus concerns, and several other structural problems. These shortcomings reduce the throughput and performance of current blockchain systems and can ultimately make them non-viable for commercial and enterprise use across the industries, including business applications, whether they are desktop, mobile, devices or sensor-based applications.

Distributed Ledger based approaches have been proposed as a means of sharing information across a complex cross platform and cross-institutional data infrastructure which require decentralized message or transaction creation and consumption with consensus for verification and transparency across multiple Distributed Ledgers while issuing corresponding transaction receipts to each stakeholder of a given transaction.

Commerce, industry and personal use of computing is moving from the centralized to a decentralized model with over 100 Billion autonomous devices estimated to join the Internet by 2025 in smart cities, smart homes, autonomous vehicles, wearable devices and internet of Things (IoT) applications. AI/ML (Artificial intelligence/Machine Learning) applications are expected to produce a huge demand for decentralized and localized computing applications and data storage, also called Edge computing.

TABLE 1

KEY OPERATIONAL FEATURES IN CENTRALIZED, DECENTRALIZED AND DECENTRALIZED DISTRIBUTED COMPUTING SYSTEMS

| FEATURE | CENTRALIZED | DECENTRALIZED | DECENTRALIZED DISTRIBUTED |
|---|---|---|---|
| SERVER | Conventional server-based computing system Data resides in server | Ledger updates to server Proof of work required to update ledger | Microservice-based distributed ledger, & data store of verified immutable transaction ledgers and receipts |
| CLIENT | 'Light' clients | Data resides in client Clients mined to update server | Decentralized Application and Data store on Clients Majority consensus required for to update ledger and receive receipts after consensus |
| PERFORMANCE | Variable, but generally lower throughput and more expensive than decentralized | Low throughput High costs of transactions due to mining requirement | High availability & throughput Latency & transaction cost issues persist in current technology options |
| SECURITY | Vulnerable to hacking & fraud with a single point of failure | Long latency makes system vulnerable to fraud | Resistant to program failure, cyberattack, hacking & data breach as data is distributed and decentralized |

The internet of things (IoT) is a system of interrelated computing devices, mechanical and digital machines, objects, animals or people that are provided with unique identifiers (UIDs) and the ability to transfer data over a network without requiring direct human-to-human or human-to-computer interaction.

Blockchain was the first-generation decentralized computing environment among distributed ledger technology (DLT) using mining to process and validate decentralized transactions. The initial design of blockchain didn't factor scaling to millions of nodes and a completely decentralized and distributed computing environment. This first generation of decentralized platforms powered Bitcoin and similar applications, but with a very high cost of mining and consequent latency challenges when validating transactions. Ethereum and others expanded blockchain's capabilities by developing Smart Contracts that automatically record and enforce contracts without human oversight. An alternative DLT approach developed for Distributed Ledgers is based on Directed Acyclic Graphs (DAG), used by IOTA, whose data structure is called the Tangle, and by Hashgraph. DAG removes the need for mining, which can reduce cost per transaction and create serious latency problems in blockchain and can allow atomic exchange transactions between users to occur simultaneously or not at all. DAG may then improve upon blockchain's severe scalability, latency and throughput problems in a decentralized and distributed computing environment.

There are well established issues with the operation of blockchains, such as:
 a) Poor scaling, the inability to handle high throughput to deliver enterprise-class performance.
 b) High consensus latency beyond what typical current DLT platforms can achieve. For example, Ethereum performs at 7-13 transactions/seconds and can take up to 7-9 days to validate and update the ledger; Bitcoin at 1-3 Transactions per second, and a few hours to days to validate transaction.
 c) The time stamp on the Distributed Ledger for a transaction is the time stamp of Proof-of-Work (or Mining) and not the actual time stamp of the transaction, rendering Blockchain ineffective or contentious for time sensitive Enterprise applications such as Banking, travel booking and supply chain.

At the same time, security and privacy cannot be sacrificed to any significant degree and should be increased, as core USP of decentralized computing.

Mining is required to validate and update details to the Distributed ledger of transactions. Blockchain mining is expensive and not viable due to the cost of electricity, capital needs and personnel needs for mining. It costs about USD 3000-5000 to mine a single Bitcoin which translates to about USD 100-220 per transaction. Other platforms have costs ranging from USD 3-50 per transaction.

All networks need to achieve at least (n/2+1) (i.e. majority) consensus to validate a transaction. Viral protocols, coordinators, or communication timeouts are vulnerable to node failure or distributed denial of service (DDoS) attacks. Consensus in current protocols can be breached by malicious attacks, due to high latency (as described above) and poor throughputs.

TABLE 2

LIMITATIONS OF CURRENT BLOCKCHAINS

| | |
|---|---|
| PERFORMANCE & COST | Poor scaling & low throughput |
| | High consensus latency |
| | Expensive mining costs |
| CONSENSUS & SECURITY | Vulnerable to node failure & DDoS |
| | Consensus easily breached because of long latency & low throughputs |
| LEDGER ATOMICITY | Chronological ordering of transactions not available |
| TIMESTAMP LATENCY | Event time stamp not available. Ledgers present Proof-of-Work (Mining) time stamp |
| D-APPS & PAYMENTS | Lack of scaling & security |
| | Cost of transactions remains high |
| CENTRALIZED SEARCH | Slow and incomplete search & indexing |

Blockchain and DAG DLT platforms trade decentralization to reduce latency and promote reliability and security. To cater to security needs, decentralization is compromised as they are unable to provide a reliable solution with low latency. Using legacy encoding or encryption in transport layers, severely compromises security. Transaction latency allows for double spend fraud (DSF) to be perpetrated. DSF can occur in the time lag between initiating a transaction and validation of the same transaction, where the information can be acted on twice at two different action-effecting on-line locations.

Security can be adversely affected or breached by a 51% attack by a group of miners controlling more than 50% of the network's mining hash rate or computing power. The attackers would be able to roll back transactions submitted to a block or even prevent new transactions from gaining confirmation, allowing them to halt payments validation between some or all users, allowing for multiple spending of the same digital money for multiple transactions.

What is needed is a consensus algorithm that can provide higher security while also providing an immutable consensus in milliseconds to mitigate many of the shortcomings of current DLTs.

Directed acyclic graphs (DAG) platforms post network packet timestamps. Consensus is impacted if nodes fail while propagating data to the next node. Time Stamp Latency has also resulted in DSF where mirrored nodes conduct duplicitous transactions that remain undetected until posted to the shared ledger.

Lack of Atomicity on ledger results in failure to maintain the chronological order of a transaction and to provide an 'all or none' conclusion to that transaction. Ledger atomicity is difficult to achieve in many transactions in both blockchain and DAG-based DLTs. A ledger handling millions of transactions needs to maintain transaction atomicity, as many time-sensitive applications demand the chronology of events and transactions, and is required by banks, exchange and travel applications.

Failure to ensure atomicity can lead to disputes in transactions. Decentralized applications (D-Apps), which further decentralize data and storage, have few precedents except for peer-to-peer (P2P) wallet transactions. As enterprises migrate from centralized to decentralized applications, architecture and implementation remain a challenge due to lack of infrastructure and awareness. While numerous use cases for D-Apps have been discussed, implementation and focused guidance for production grade deployment has been extremely poor. The migration to decentralized applications will be significant in use cases demanding distributed data generation and consumption with High Privacy, Security, multiple ledgers requiring reconciliation, high throughput and AI/ML applications. These would be particularly seen in Banking and Finance, Healthcare, Insurance, Travel, Supply Chain, Government and Identity management among others.

What is needed, therefore, is a blockchain platform that provides for a decentralized search index, comprehensive identity management, higher scalability and throughput, and enhanced computing performance in the collection, storage, analysis and transfer of information records and related services, for example, in healthcare, medical prescription patients, physicians, insurers, and their health care affiliates; in Finance, Bank transactions such as payments, receipts and interest application; in Travel and logistics, ticket booking, check-ins and pickup and drops. Through the Distributed Ledger tracking ability of the present invention, it will be possible to build a database to online transaction processing and real-time analytics applications to deliver fast, secure and reliable applications and databases.

SUMMARY OF THE INVENTION

One aspect of the invention is methods, apparatus and systems enabling a method of executing, confirming and storing a transaction in a serverless decentralized node network comprising a number N of active nodes of at least five active nodes in the absence of a centralized storage server, the decentralized node network enabling peer-to-peer consensus of a transaction including a candidate node, from among the N active nodes for becoming a leader node in a single peer-to-peer, node-to-node transaction, outputting a pulse into the decentralized node network to obtain validation by a confirmation level of at least N/2 plus 1 nodes, and being identified as the leader node for the single peer-to-peer transaction. In the method, after the leader node has been identified, a transaction-initiating node in the decentralized node network shares a set of transaction details for initiating the peer-to-peer transaction to a second node, and the second node when receiving the initiated peer-to-peer transaction through the decentralized node network approving the initiated transaction with an acknowledgement.

This system and supported method, for example, can be used to provide security, retrievability, confirmation, verification and/or analysis of any transactional or recorded or stored or original data or information. The fields of technology in which this system and supported method are useful include, but is not limited to a patient-centered healthcare information network to access, store, analyze, process, and securely transmit data that will form part of the information or data on which processing, transferring and/or storage of data, assets and permanent records are desired in trade, healthcare, medical devices, supply chain management, manufacturing, energy, utilities, inventory management, government, entertainment and media, retail, consumer, financial transactions (including cryptocurrency), sales, finance or leasing transactions, store and warehouse and manufacturing inventories, police records, education records, real estate transaction or listings, travel (e.g., train, ship and airline) reservations, hotel and resort accommodation transaction (including reservations and charges) and purchases, medical information and electronic health records of individual medical prescription patients with each stakeholders' consent.

Embodiments enable a system operatively connected with a Decentralized and distributed ledger network to use the distributed network for validation (i.e., authorization) of a Message which may contain payment transaction or any confidential information or transaction. The system receives an information record associated with a transaction, wherein the transaction record comprises transaction data indicating a sender, a receiver and an information record; accesses a distributed ledger stored in the memory device, wherein the distributed ledger is updated based on communications from a distributed ledger network; and, using information record with appropriate logic, determines whether the transaction record represents a valid transaction by, e.g., communicate the information record to a validating node for validation of the information record by majority consensus in the network.

Once validated, the system (or validating node) communicates validation of the transaction record to the distributed ledger network, e.g., by updating the distributed ledger with information indicating validation of the information record and providing access to the distributed ledger to the network.

A method and system are provided to support a decentralized distributed ledger in which transactions are recorded by parties to the transactions without the use of a blockchain. A distributed ledger system provides a protocol framework that supports the development of protocol flows. A protocol flow is computer code that controls the performance of a transaction by the party or parties to the transaction. Protocol flows can be developed for different types of transactions.

The distributed ledger system allows transactions to be proposed, accepted, and notarized by a notary and stored without the use of a blockchain ledger. The distributed ledger system can avoid the expense of the computational and storage resources needed to redundantly verify a transaction and store evidence on the many nodes of a blockchain distributed ledger. The method may have a single Decentralized Application run and that single Decentralized Application participates in a single channel operated the cluster of nodes and the Decentralized Application.

The foregoing general description and the following detailed description are exemplary and are intended to provide further explanation of the invention as claimed.

BRIEF DESCRIPTION OF THE DRAWINGS

The accompanying drawings constitute part of this specification and illustrate an embodiment of the invention but do not provide upper limits to the breadth and scope of the invention.

FIG. 9 shows a schematic of a triple entry data base financial system.

DETAILED DESCRIPTION OF THE INVENTION

Figure 1:
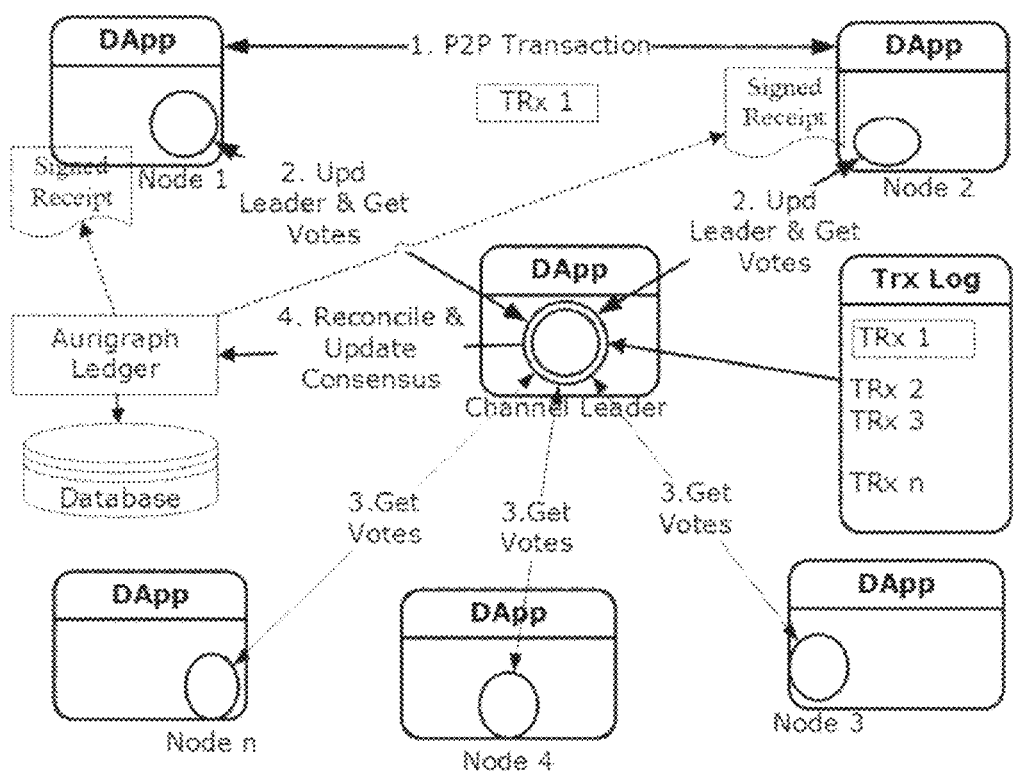
FIG. 1 is a schematic of one embodiment of the electronic messaging platform that may be used for sending information between two devices, users, smart phones, computers or IoT devices, after local processing the information record and storage. Information is collected, analyzed and transmitted between any two designated users using the advanced DLT platform and AI predictive analytics disclosed in the present invention. An entire channel with nodes and ledgers is shown.

The present invention uses next-generation of non-centralized distributed ledger technology (DLT) to create an intelligent and secure platform for decentralized peer-to-peer messaging. The software systems of the invention are designed to optimize data inputs. In the method of the invention, the software platform consists of a complete end-to-end Distributed and Decentralized system with mobile, computer, wearables, sensors or device interfaces, cloud storage and analytical tools, which allows for the creation of robust systems to support large volumes of data, analytic platforms, and machine learning. This invention is particularly applicable to an internet-based system in which information and services are provided to members of the network. It should be understood, however, that the present system and method may be implemented in other applications outside the scope of this disclosure.

The present technology includes embodiments which enable a protocol and system operatively connected with a decentralized network of nodes and distributed ledger for validation of a confidential Message or Transaction. The system receives an information record, wherein the record comprises transaction data indicating a sender, a receiver and an information record between the two; the Hash of the Message between the sender and the receiver is then shared within a secure network of devices to obtain consensus by other active nodes voting, determined by randomly elected network leader which determines if majority of nodes have consensus on message/transaction, share Transaction receipt to sender, receiver from the Distributed Ledger for transparency, immutability, reconciliation and notarized audit allowing transactions to be proposed, accepted, notarized and stored by a trust-less third-party. The distributed ledger system can avoid expensive computational resources needed to redundantly verify transactions and store evidence on multiple nodes of a blockchain while it also manages to issue receipts to participating nodes of the network.

The present technology includes a distributed ledger technology that is an advancement over both Blockchain systems and non-centralized distributed ledger technology that has already advanced past blockchains as a type of a distributed ledger. Distributed ledgers use independent computers (referred to as nodes) that record, share and synchronize transactions in their respective electronic ledgers (instead of keeping data centralized as in a traditional ledger). Blockchain organizes data into blocks, which are chained together in an append-only mode. Blockchain/DLT (distributed ledger technology) are the building block of "internet of value," and enable recording of interactions and transfer "value" peer-to-peer, without a need for a centrally coordinating entity. "Value" refers to any record of ownership of asset—for example, money, securities, land titles—and ownership of specific information like identity, health information and other personal data. Blockchain technology suffers from several technical issues, including latency, double entry and computing and energy power requirements. Some combinations of these shortcoming can cause validation times to be minutes, hours or even days, which is not acceptable in today's high-speed commerce. Distributed ledger technology (DLT) could fundamentally change the financial sector, making it more efficient, resilient and reliable, but not with these deficiencies through real-time reconciliations and audits, eliminating significant effort and costs.

This can address persistent challenges in the financial, information storage and records sectors and change roles of participants in the system. DLT has the potential to transform various other sectors as well, like manufacturing, government, financial management systems and clean energy.

The present technology improves the functional performance of networks of individual processors (nodes) with respect to speed of storing and verifying authenticity of information transmitted into and within the network. Specifically, as opposed to the long periods of time involved in the blockchain technology used in cryptocurrency transaction, the present system reduces response and verification times by eliminating expensive mining costs and reducing latency to a few seconds or even under a second. Programmable consensus gives enterprises the ability to set consensus levels to meet their security and business demands, and individual ledgers may be set with different levels of consensus. The invention is thus able to deliver very high throughput at very low costs, delivering significant technology and business value across multiple hardware elements and software operating systems such as mobile devices, wearables, tablets, desktop computers and other industrial devices. Further, with the real-time generation of receipts, Reconciliations, and Audits are achieved in real-time, delivering unmatched risk mitigation and fraud prevention to businesses' ancient accounting techniques around Double-entry book-keeping for the first time in over 600 years.

At the same time, high level of security and inability to have the system hacked is maintain because of end-to-end security using post-quantum cryptography and high throughput of transactions. Even with the use of smartphones and privately maintained processors that may individually be sensitive to external hacking and corruption, the system and its stored information is not susceptible to security breach as it is secured using Post-quantum cryptography. As data is encrypted, decentralized and distributed, the threat of hacking will cause little or no data loss and even lesser risk to enterprises and their users. Further, the DApp and the node's memory consumption and CPU resources are low enough to enable deployment across wearable devices, mobile phones to desktops, even while delivering over 100,000 transactions per second on the platform.

In the practice of the present technology. the processor of the compute device can be any suitable processing device configured to run and/or execute distributed database instance. For example, the processor can be configured to update distributed database instance in response to receiving a signal from compute device, and/or cause a signal to be sent to compute device, as described in further detail herein. More specifically, as described in further detail herein, the processor can be configured to execute modules, functions and/or processes to update the distributed database instance in response to receiving a synchronization event associated with a transaction from another compute device, a record associated with an order of synchronization events, and/or the like. In other embodiments, the processor can be configured to execute modules, functions and/or processes to update the distributed database instance in response to receiving a value for a parameter stored in another instance of the distributed database (e.g., distributed database instance at compute device), and/or cause a value for a parameter stored in the distributed database instance at compute device to be sent to compute device. In some embodiments, the processor can be a general-purpose processor, a Field Programmable Gated Array (FPGA), an Application Specific Integrated Circuit (ASIC), a Digital Signal Processor (DSP), and/or the like.

The display can be any suitable display, such as, for example, a liquid crystal display (LCD), and LED display, plasma screen, a cathode ray tube display (CRT) or the like. In other embodiments, any of compute devices includes another output device instead of or in addition to the displays. For example, any one of the compute devices can include an audio output device (e.g., a speaker), a tactile output device, and/or the like. In still other embodiments, any of compute devices includes an input device instead of or in addition to the displays. For example, any one of the compute devices can include a keyboard, a mouse, retinal response system, voice response system, and/or the like.

The compute device has a processor, a memory, and a display, which can be structurally and/or functionally like the processor, the memory, and the display, respectively. Also, distributed database instance can be structurally and/or functionally like distributed database instance. The term "compute device" is used to generically encompass computers, processors, microprocessors, logic devices, field programmable gated arrays, application specific integrated circuits and the like. They can be on main frame, desk top, laptop, hand held or other devices. A node is any compute device having sufficient functional capability to at least temporarily store and execute an accessing software so that data can be entered into the DLT system through user input controls (e.g., keyboard, touchscreen, voice entry, etc.). These may be, as further indicated herein, hand held devices (smart phones, tablet devices), table top devices (PC or Mac or other systems) and mainframes for central control and establishment of the internet connections. No single component need have the capability of storing all DLT data and information as it is distributed, but such a back-up node or compute device, without open access through the internet, may be used.

The compute device has a processor, a memory, and a display, which can be structurally and/or functionally like the processor, the memory, and the display, respectively. Also, distributed database instance can be structurally and/or functionally like distributed database instance. The compute device has a processor, a memory, and a display, which can be structurally and/or functionally like the processor, the memory, and the display, respectively. Also, distributed database instance can be structurally and/or functionally like distributed database instance.

Even though compute devices may be like each other, each compute device of the distributed database system can be different from the other compute devices. Each compute device of the distributed database system can be any one of, for example, a computing entity (e.g., a personal computing device such as a desktop computer, a laptop computer, etc.), a mobile phone, a personal digital assistant (PDA), and so forth. For example, compute device can be a desktop computer, compute device can be a smartphone, and compute device can be a server.

One of the closest known technologies (Hashgraph, owned by Hedera) to the present invention (which is referred to herein and will be later referred to in commerce when introduced) as Aurigraph™ information systems are compared below:

| Aurigraph ™ system | Hashgraph |
|---|---|
| Atomic multicast protocol for P2P communication in a Public or permissioned network with variable number of active nodes Active nodes respond to heartbeat to confirm presence and vote for Consensus. | P2P communication in a Permissioned network of nodes, all of which are presumed to be active. Unable to track inactive nodes and new nodes joining or dropping off the networks |
| Proof of Consensus Lighter, Faster, Robust and accurate Quantum-secure and open source implementation to Drive Industry 4.0 and IoT applications and adoption. Support for dynamically varying nodes base in a cluster as active nodes are determined in very short intervals (150-300 ms) Programmable Consensus as Channel/DApp admin can set consensus levels, even in a varying cluster size | Gossip Protocol inefficient as it may have duplicate voting request to a node as its propagation is random. No voting history. Hence, can be slower. No acknowledgement sent by receiver node to sender node to confirm receipt Event order may change when multiple events are randomly propagated for consensus simultaneously Proof consensus requires $2/3^{rd}$ nodes to vote - inaccurate, when dealing with dynamically changing number of active nodes. Proprietary, not open source Consensus takes 15-25 seconds |
| Seamless integration across heterogeneous devices both internal and external networks. Lower resources and memory consumption. Can handle heterogeneous networks seamlessly including firewalls, IPV4 and IPV6. | Very high memory and resource consumption Unable to work with nodes across heterogeneous and firewalled networks |
| Faster and more reliable network protocol with consistent event order across network propagation, maintaining ledger atomicity against UTC time | Needs at least four rounds of P2P propagation to determine consensus. Higher inaccuracies if propagating node fails. Voter count can be impacted a node crashing while propagation. Event Order inconsistent because of variable network time stamp |
| Post Quantum NTRU Encryption for end-to-end communication and storage | Unsecure P2P communication, uses Encoding, no evidence of Encryption leading to High security risk |
| Support Desktop Windows, Linux and iOS) and Mobile (Android, iOS) platforms with lower resources (memory and battery) Support for cross platform devices in a cluster | Poor Cross-platform P2P Communication - unable to communicate across Windows and Linux desktops in a cluster Not available on mobile devices and OS Suitable for Permissioned Networks with fixed number of nodes. Not suitable for dynamic clusters as nodes need 90-120 seconds to add new nodes' address to cluster list and restart as "Hot Updates" are not supported |
| Support for Native and IPFS based P2P file transfer. -First platform to handle file transfer with transactions, support for enterprise DApps Share files and media between nodes and clients on a secure P2P transport layer. Unlimited data size with attachments | Cannot handle attachments (Neither can any other Blockchain environment) Peer to Peer communication limited to 1024 bytes No support for file attachments |
| Fault-tolerant Atomic broadcast protocols add/remove new devices in | Gossip Protocol for P2P communication suited for Permissioned Networks |

| Aurigraph ™ system | Hashgraph |
|---|---|
| permissioned and public networks seamlessly. Consensus achieved and recorded in transaction payload. Once consensus is reached, the entire payload is posted to the ledger with every vote recorded to enable consensus monetization. Enable incentivization and monetization for voting nodes | with fixed number of nodes. Can't handle dynamically varying number of nodes, especially for 2/3$^{rd}$ Consensus In case a node crashes while handling voting, the respective vote and information chain is broken, and further propagation is halted which may impact the net consensus. New Nodes require Nodes address and port Id to be updated in the list in config.txt of each active node in the cluster and restarted. Each restart takes between 90-120 seconds after config.txt is updated. Hence network can be down for a long time if nodes are joining the network continuously. |
| Metering and Monetization for individual nodes participating in consensus and Torrent downloads | Consensus metering not possible. |

The significance of these distinctions will be emphasized in discussions herein, evidencing the fact that the present distributed Ledger Technology (DLT) of the present invention (referred to as Aurigraph™ information systems makes connected technology over the internet perform more efficiently and better about throughput and latency, while maintain post-quantum security.

One aspect of the present technology includes a novel distributed ledger-based information based on distributed ledger technology with decentralized principles including:

a multiplicity of at least five input or access processor nodes including at least one of each of medical clinicians and patients, wherein each node is provided with at least data entry level access into the DLT format through at least one respective one of the at least five input or access nodes;

wherein after establishment of a first transaction or event, each node can add a unique transaction onto the Ledger (distributed ledger) upon achieving consensus of a majority of processor nodes; and wherein individual transaction content is accessible at various levels of content dependent upon corresponding levels of administrative authorized access through specific keys.

The distributed ledger may include access where users, each information record contains an identifier unique to each user within the base.

The distributed ledger information base may also contain accessible identifiers wherein each transaction contains an identifier unique to each message or record information.

Access to the distributed ledger information base may include each user compute device node being in communication with electronic components that directly messages to other nodes on a peer-to-peer model. Additionally, the distributed ledger information base may contain encrypted information record of the message or transaction Blockchain, General This is a system in which a record of transactions made in informational storage with high requirements for security are maintained across several computers that are linked in a peer-to-peer network in which individual accessing users can have a look at the Distributed Ledger and see evidence of past and currents events. Although it sounds like a series of defensive maneuvers, the blockchain is a way to record and maintain immutable log of events and data, and the foundation of information.

Blockchain is based on Distributed Ledger Technology for maintaining a permanent, immutable and tamper-proof record of transactional or executed event data. A Distributed Ledger functions as a decentralized Ledger or Log that is managed by computers belonging to a peer-to-peer (P2P) network. Each of the computers in the distributed network maintains a copy of the ledger to prevent a single point of failure (SPOF) and all copies are updated and validated simultaneously currencies like Bitcoin.

Distributed ledgers are an Immutable Log or Ledger of events, but unlike traditional databases, distributed ledgers have no central data store or administration functionality. Changes to the ledger are recorded across the participating systems in a matter of minutes or seconds and records are protected through cryptography. An important benefit of a distributed ledger is that assets can be tracked and traded without the need for a centralized point of control. Another key benefit is that the consensus mechanism used in distributed ledgers lowers the risk of fraud, because any attempt to tamper with the information in one ledger will have to be carried out in every other copy of the ledger me as well as all the previous transactions at the exact same time by undoing the cryptography for each transaction and its previous transactions till the first transaction, to make a single change.

Distributed ledgers take the concept of the double-entry bookkeeping system used in accounting a step further. Double Entry bookkeeping requires a Trusted Third party to audit and verify the transactions and events, which can be very tedious and time consuming when the numbers are large. Blockchain technology may represent the next step for accounting: Instead of keeping separate records based on transaction receipts, companies can write their transactions directly into a joint register, creating an interlocking system of enduring accounting records. Since all entries are distributed and cryptographically sealed, falsifying or destroying them to conceal activity is practically impossible. It is similar to the transaction being verified by a notary—only in an electronic way. In a digital context, distributed ledgers build upon double-entry bookkeeping by recording a transaction's credit and corresponding debit simultaneously across multiple computer systems. In the enterprise, distributed ledger, which originally gained popularity for supporting cryptocurrencies such as Bitcoin and Ether but has since been proposed for several innovative use cases wide across wide a range of industries.

Blockchain is a distributed Ledger that maintains a continuously growing list of ordered records, called blocks. This technology has the potential to revolutionize the banking industry thanks to Fintech, Banks, and other non-financial protagonists. The first function of banking is to create money. The creation of money is the consequence of debt which finances prosperity out of the future and economic growth. This debt's source however, is from junk bonds like CDO (Collateralized Debt Obligation-structured financial product which pool together assets which are repackaged in slices that are sold to investors) and CDS (Credit Default Swap—similar to CDO), which have higher default risks in investment-grade bonds. This financial product was offered by banks until 2009. For decades, debt has been a commodity supported by rating agencies such as Standard & Poor's and Moody's. The financial crisis of 2007-2009 was linked to high yield corporate bonds rated AAA instead of junk bonds status. For example, when you place your money in savings, 90% could be lent to other people, with 10% staying in the bank's accounts (Basel III). Consequently, many people have lost faith in the security of placing their money in banks. All these junk bonds had a significant influence on our economy. People now are demanding more transparency. This is exactly what Blockchain offers.

Conceptualized in 2008 by Satoshi Nakamoto, "Blockchain technology" was really revealed to the public in about 2010, by Bitcoin, a cryptocurrency based on the blockchain concept. This technology is based on blocks, which provide a continuously growing list of ordered records. This concept is fundamental to explain the potential of this technology because it is an engine of transparency. Nowadays, for financial transactions, banks use clearing houses to control the evolution of the transaction. In fact, they assure that the buyer receives his goods and the seller receives his money. But with Blockchain, banks would have no need for clearing houses. Anybody could become the "trustworthy" person. And of course, banks will re-assume this role. Consequently, many companies have started to become interested in this technology with the emergence of Bitcoin during the 2010's. Moreover, Blockchain technology could be a great tool against shadow banking because we could keep clear records of transactions.

Blockchain, as a basic tool of technology can provide many advantages. Many people are assigning certain qualities to Blockchain. But only some of these are interesting for the banking or other industries for transactional applications needing multiple ledgers and their validations. Here are some potential benefits of this technology.

First, Data quality. With Blockchain, we will have all the data from previous transactions. This benefit is very evident because it is fundamental to the Blockchain concept.

Second, security: With all this data, the banking industry (and other industries that require secure event/occurrence security) can provide a much better security ecosystem.

Third, cost: With this high level of security, banks will have no more need to develop other security systems. And in time, the cost of Blockchain will fall due to economies of scale.

Fourth, it's developed by users: The user is the key actor in this technology. They get control of it and assure the decentralization of the system.

Fifth, durability: With the decentralization of the system, the technology is less exposed to failure. In fact, it is also less exposed to malicious attack.

In the next few years, only specific technologies will have an impact on the banking industry. These may include technologies such as "Skeleton keys". This term encompasses:

Machine learning (heuristic or AI)
Neural network or Deep learning
Natural language processing
Artificial intelligence
Blockchain (and related smart contracts)

Some of these features are in line for development by high tech companies. Over the last decade, investments into Fintech start-ups working on Blockchain grew significantly. A good example of a Fintech concept which is working on accelerating the adoption of the Blockchain is Ledger. This company offers cryptocurrency technology based on Blockchain, such as multi-signature, multi-currency, or time locked payments.

It had been previously considered that only a few protagonists could benefit from this blockchain technology. The biggest entry barrier is funding. The banking industry is generating billions of dollars each year in revenue and is also playing a crucial role in the modern economy. Therefore, banks have great funding capacities and are using it to protect and assure their dominant position.

A Blockchain transaction requires very little oversight for processing reconciling. Consequently, the expansion of jobs in maintaining individual segments in this field may not be relevant anymore. To use Blockchain, you need computers, data storage and data centers, not cubicles filled with people. Conventional Blockchain infrastructures need a lot of energy for air conditioning and powering machines. Consequently, all this energy used has a negative impact on the environment; unfortunately, it is still difficult to evaluate its impact. As it is starting to demonstrate, Blockchain is a technology with great potential. Banks are developing projects based on Blockchain, but these projects are still at an early stage.

Blockchain technology is still highly centralized in commerce in financial transactional applications, and its expanse into other areas is in its infancy.

The fundamental operation function of a blockchain is to, create a block, as each transaction occurs—and the parties agree to its details—and each agreed upon transaction is encoded into a block of digital data and uniquely signed or identified. Detailed information within each block may be constructed as 128, 256, 512- or 1056-bit identifiers. Each block (e.g., starting with block A) is connected to the one before (the original block A refers to itself) and after the original block—creating an irreversible, immutable chain (e.g., A-B-C-D . . . ad infinitum). Blocks are chained together, preventing any block from being altered or a block being inserted between two existing blocks.

Blockchain establishes a shared system or recorded events within a network of members, and this eliminates individual reconciliation of ledgers or records at each individual userpoint. Each member, of course, must be provided with user privileges to access the blockchain, and information within individual blocks is accessed and shared only on a need-to-know basis. The strongest point of the blockchain is that each individual block and any previous set and order of blocks within the chain are permanently recorded. It is (with present knowledge) impossible to alter or delete a transaction event registration that has been recorded and entered the blockchain. This is referred to as immutability.

Using a blockchain, a database, collection of previously confirmed transactions or events is permanently secured within a distributed, permissioned and fixed (unalterable) ledger.

Decentralized consensus breaks the old paradigm of centralized consensus—i.e., when one central database used to rule transaction validity. A decentralized scheme, on which the bitcoin protocol is based, transfers authority and trust to a decentralized virtual network and enables its nodes to continuously and sequentially record transactions on a public "block," creating a unique "chain": the blockchain. Each successive block contains a "hash" (a unique fingerprint) of the previous code; therefore, cryptography (via hash codes) is used to secure the authentication of the transaction source and removes the need for a central intermediary. The combination of cryptography and blockchain technology together ensures there is never a duplicate recording of the same transaction.

What is important is that with this degree of unbundling, the consensus logic is separate from the application itself;

therefore, applications can be written to be organically decentralized, and that is the spark for a variety of system-changing innovations in the software architecture of applications, whether they are money or non-money related.

Consensus is often considered as the first layer of a decentralized architecture. It is the basis for the underlying protocol that governs a blockchain's operation.

A blockchain is like a place where you store any data semi-publicly in a linear container space (the block). Anyone can verify that you've placed that information because the container has your signature on it, but only you (or a program) can unlock what's inside the container because only you hold the private keys to that data securely.

So, the blockchain behaves almost like a database, except that only part of the information stored—its "header"—is public.

The data stored can be a token of value, a crypto money balance, sequences of transactions and stored elements of individuals activities. Because of the inability of general access to the system to enable opening of individual block content, as opposed to identifying the existence and possibly general nature of a block, highly secure information can be safely contained and stored in the blockchain. With unique overlays of block identifiers, an approved degree of blockchain access can be created to determine subsets of blocks based on encrypted identifiers within each block. For example, an individual block may be placed into a subset based on all transaction of a single user (individual or corporate), individual nature of events (treatment, prescription, specific medication, planned course of treatment, identified results, physiological parameters, defined interactions/results among these parameters, and the like). Thus, a specific pre-approved blockchain user, with specific levels of authorization, can be entitled to access various of levels of information within the blockchain and individual blocks. So, the blockchain acts as an alternative value transfer system that no central authority or potentially malicious third party can tamper with (because of the encryption process). It's based on the public/private hegemony, which is the yin-yang of the blockchain: public visibility, but private inspection. It's a bit like your home address. One can publish a home address publicly, but that doesn't give any information about what that home looks like on the inside. A user will need the private key to enter the private home, and since one individual has claimed that address as unique, no one else can claim the same address once it has been registered. But with appropriate pre-authorization and codes, the content of that address, at various levels (curbside, window-peeking or room-by-room tour) can be provided.

The blockchain can also be a software design approach that binds several peer computers together that commonly obey the same "consensus" process for releasing or recording what information they hold, and where all related interactions are verified by cryptography. For releasing/accessing detailed information, a majority of peer nodes must approve release of content of a block for detailed review, but never for alteration.

Smart contracts (and smart property): Smart contracts are the building blocks for decentralized applications. A smart contract is equivalent to a little program that you can entrust with a unit of value (as a token or money), and rules around that value. The basic idea behind smart contracts is that a transaction's contractual governance between two or more parties can be verified programmatically via the blockchain, instead of via a central arbitrator, rule maker, or gatekeeper. The concept is to eliminate dependence on a central authority when two (or more) parties can agree between themselves, and when they can bake the terms and implications of their agreement programmatically and conditionally, with automatic money releases when fulfilling services in a sequential manner or incur penalties if not fulfilled.

The starting point is an assumption that when applying smart contracts, third-party intermediaries are not needed to conduct transactions between two (or several) parties. Instead, the parties define and agree on simple (or complex) rules, and they embed them inside the transactions, enabling an end-to-end resolution to be self-managed between computers that represent the interests of the users. Smart properties are digital assets (or things) that know who their owners are. Their ownership is typically linked to the blockchain.

Trusted computing (or trustless transactions): When you combine the concepts behind the blockchain, decentralized consensus, and smart contracts, you start to realize they are enabling the spread of resources and transactions laterally in a flat, peer-to-peer manner, and in doing that, they are enabling computers to trust one another at a deep level.

Whereas institutions and central organizations were necessary as trusted authorities, a certain number of their central functions can be codified via smart contracts that are governed by decentralized consensus on a blockchain.

Namely, due to the blockchain's role as the unequivocal validator of transactions, each peer can proceed and trust one another because the rules of trust, compliance, authority, governance, contracts, law, and agreements live on top of the technology. Arguably, "trusted computing" on the web is a key tenet of the new crypto-driven paradigm.

Proof of work (and proof of stake): At the heart of a blockchain's operations is the key concept of "proof-of-work," an integral part of Satoshi Nakamoto's original vision for the blockchain's role as the unequivocal authenticator of transactions. The "proof of work" is a "right" to participate in the blockchain system. It is manifested as a "big enough hurdle" that prevents users from changing records on the blockchain without re-doing the proof of work.

So, proof of work is a key building block because it cannot be "undone," and it is secured via the strengths of cryptographic hashes that ensure its authenticity. But proof of work is expensive to maintain (estimated cost of $600 M per year for bitcoin) and may run into future scalability and security issues because it depends solely on the miners' incentives, which will be declining over time. An upgraded solution is "proof-of-stake," which is cheaper to enforce but more expensive and more difficult to compromise. Proof of stake not only determines who gets to update the consensus, but it also prevents unwanted forking of the underlying blockchain.

There are several specific issues that are considered to be important to the establishment of any functioning blockchain system:

Size: Must be large and have scale (relative to the problem set or target community).

Inter-connectivity: Must exist between groups or systems inside the network (a basic requirement).

Engaged users: A good percentage of overall active users (about 30%) comes back often to use the service, at least weekly, if not daily.

User experience: Must be unique, original, and enable some new value creation while users are on the service.

Network effects: The value of the service increases for each user, as others use it or join it, and that value is propagated on the very network that was created.

Defensibility: Barriers to entry are gradually erected and strengthened by virtue of growing the service while it gets more valuable with each new user, also resulting in high switching costs.

Monetization: As the network matures, one or several atomic value units emerge and become the basis for sustainable economic activity.

In order to properly evaluate the network effect puzzle, it is desirable to look at the ecosystem along three key dimensions:

1. Network effects criteria
2. Ecosystem components

The second dimension relates to the targeted ecosystem components, and I see them comprised of:

Consensus engine, including the underlying protocols that govern it or support it (e.g. mining).

Blockchain platform services, including the software tools and external linkage capabilities.

End-user Decentralized applications (DApps), including wallets, special browsers, smart contracts, pegged services, or being part of DAO (double access objects).

The third dimension includes the various players and actors, whether they are based on the bitcoin blockchain or another one, the bitcoin currency or another one, or a fully independent platform.

We could place all of this in a matrix, as depicted below, and if you evaluate your favorite players and actors inside each intersecting box, you will find there are a few holes, plenty of opportunities for improvements, and a lot of works-in-progress.

There is still more to the makings of network effect. You also need to count on:

Number of apps or services
Number of users on these apps
Market capitalizations
Number of developers
Security
Scalability
Reliability
Marketing The following Table shows a comparison among commercial systems for provision of these properties.

| Criteria | Blockchain | Iota | Hedera | AuriGraph ™ |
|---|---|---|---|---|
| Trans. Latency | 15-24 sec/trans. Timestamp of Proof of Work, not transaction <13 TPS | Low Latency Tangle protocol Timestamp of Proof of Work, 1000 TPS claimed, 182 tested | Low Latency - <15-30 sec. Gossip Protocol for P2P communication Consensus Timestamp of the network >100000 TPS Closed and controlled by single entity | Realtime, with 0 Latency - <1 sec. Application Layer Atomic Multicast Protocol for P2P communication and consensus Event Consensus Timestamp of the network >100000 TPS with file attachments Open source components |
| Mining | Mining updates to ledger Energy spent by miners Avg Transaction Fee: $0.37 | Mining-less implementation Tangle protocol for consensus Zero Transaction Cost | No Mining required 2/3$^{rd}$ consensus using gossip protocol Transaction Cost to be announced | No Mining Zero Transaction Cost |
| Trans. Proof | Proof of Work/Proof of Stake - Requires Block size: 33 Kb, Reward/ block: ~3 ETH | Proof of Work using Tangle | Proof of Consensus - 2/3rds consensus by "Virtual Voting" | Programmable Raft based consensus using multicast - 51-90% |
| Security and Vulnerabilities | Risk of fraud: "Double-Pay" Ethereum smart contracts vulnerable | CURL- homegrown hash algorithm reported to have collision in 2017. | P2P communication security using SHA2 No support and security for files transfer. | Transport layer security uses Post-quantum cryptography P2P File Transfer |
| Ledger | Public Ledger Built on MySQL | Public Ledger Built on MySQL | Native Ledger only Hashgraph ™ claims over 250k TPS | Open, High performance Distributed Ledger built on Serverless Microservices architecture and Graph Databases, to handle over 10K TPS/instance. DLT includes support for Identity Management, Contracts and D-App Store to follow later. |
| DApps, Node/Wallet | Native Ethereum Wallet | Native IOTA Wallet Support for Micro transactions | SDK provided to build applications. Public Ledger from Hedera Transaction fee to be announced | Build DApps for public and permissioned applications with dedicated channels for privacy and security Multi-currency, Multi-sig-wallet Support for Micro and Nano Transactions |
| Applications | Transactions and applications | Ternary instead of Binary for computation needs Learning curve | To be announced | SDK/API to build and integrate applications for Enterprise integration. Short Ramp up from FIAT to Cryptocurrencies. |
| KYC/AML | Anonymous users | Anonymous users | To be announced | DApp developer can design based on |

-continued

| Criteria | Blockchain | Iota | Hedera | AuriGraph ™ |
|---|---|---|---|---|
| | | | | permissioned or public network requirements Sovereign Identity integration and management for KYC/AML |

With reference to FIG. 1, in a method of the invention, the platform is split architecturally into a distributed server and decentralized nodes. A peer-to-peer (P2P) communication and consensus protocol is combined with a decentralized search to connect users to a robust and high-performance platform, which reduces network latency and transaction costs while improving scalability, throughout, security and performance. These features make it feasible for large scale adoption for enterprise decentralized applications (D-Apps) for micro- and nano transactions and decentralized content to reduce operational costs and network infrastructure.

With further reference to FIG. 1, the distributed server provides a highly scalable platform and protocol that yields secure fail-proof P2P communication and consensus. According to the invention, a mining-less platform is provided with high-performance distributed ledger and DApp-Store and decentralized search. In one embodiment of the method of the invention, a protocol uses an application layer atomic multicast protocol to validate transactions faster on distributed ledger while securing the entire platform with end-to-end post-quantum cryptography along with a Merkle tree implementation to ensure immutability of the transaction records. DLT with microservices architecture and distributed graph ledger provides scalability and improved through-puts and low response times, thereby reducing validation time, improving performance and detection of anomalies, and increasing security and immutability.

A method of the invention supports P2P communication and consensus with multi-sig, multi-currency wallet. App developers can integrate their D-Apps with the appropriate node using SDK to facilitate P2P communication and consensus with payments. Whenever necessary, the invention provides this feature on a mining-less platform for zero-latency, micro- and nanoscale transactions without needing a payment infrastructure to manage and receive payments. Merchants can integrate their backend systems using APIs with their D-Apps and wallet to complete transactions, thereby eliminating all intermediaries and bringing transaction costs and latency down to near-zero. Further in the method of the invention, contracts SDK provides integration to develop smart contracts and publishing to the D-Store, which may be employed by users and merchants. According to the invention, transaction consensus is reached and updated to the distributed ledger in <500 milliseconds, while the platform can support over 100,000 TPS.

In a method of the invention, D-Apps, hypermedia content, and contracts are available directly from the publisher's nodes. Publishers can add content to their D-Apps, which is immediately available on D-Search for instantaneous search and retrieval. According to the invention, the content may be monetized on the platform with the payment services. D-Search is fully GDPR compliant as the search content is under the control of the publisher. If the publisher removes the content from the node, it will automatically and immediately be removed from D-Search without copies.

In a method of the invention, contracts can be integrated with nodes and clients to provide for enhanced commercial activity. ERC 20/777 compliant Java Smart Contracts can be integrated with contracts SDK, notwithstanding the large Java developer base. A key feature of the invention is rigorous compliance to statutory and regulatory requirements with every user or enterprise covered under KYC/AML.

In one preferred embodiment of the invention, the testing and measuring instruments and the control devices are connected via a local area network with a data controller, in which all the vital information obtained in the system is stored. Instruments and devices are permitted to access the controller through the network to retrieve necessary vital information. In another preferred embodiment arranged in the distributed network configuration, the vital information obtained by respective measuring instruments is stored therein.

In one preferred embodiment of the invention, decentralized mobile apps can be used for messaging. According to the invention, a user can configure an app (iOS, Android, web) with data from his personal records, files and messaging in the method of the invention, AI may be used to determine the most the effective implementation in the DApps with the data stored locally on the device and a hash shared based on evidence—from the database. According to the invention, there is automatic backing-up of the data on a remote server in the event of device loss, or if file sizes are large. AI/ML apps work efficiently on local devices with zero latency and cost. Distributed apps communicate on a P2P model, eliminating the need for a central server and single point of failure.

In conjunction with the personal monitoring system of the present invention illustrated schematically, a software information system performs a method of analyzing records for an enrolled consumer to assess and report on published and well-established quality indicators. The system analyzes overall data, the system provides an efficient and accurate means to supplement data with data from user records.

In the method of the invention, the DApp uses mediums available through information technology and telecommunications to provide a program for Decentralized applications to communicate and distribute messages and transactions In the method of the invention, email connections are enabled between users to provide personal messaging and requests to the local database;

In one embodiment of the invention, the network includes a satellite system. Internet includes but is not limited to intranets, local area networks and wide area networks. Computers include but are not limited to personal computers, stand-alone computers, tower computers, servers, desktop computers, laptop computers, notebook computers, personal digital assistants, work stations, main frames, minicomputers, supercomputers and wearable computers. Computer can also be a special purpose computer programmed to perform algorithms. Wireless device includes but is not limited to cell phones, personal digital assistants, wireless Internet cards, wireless modems and smart cards.

Databases include but are not limited to relational databases, object databases and post-relational databases. According to one embodiment of the invention, a computer and a database can be coupled together via an Ethernet connection that can be placed in a location such as but not limited to a government facility, a private company facility, a clinic, a vehicle or the like. The invention is not limited to a number of computers or wireless devices. Any number of computers or wireless devices that can be connected to a network, such as a wireless network or the Internet, or any other network, may be used.

Figure 2:
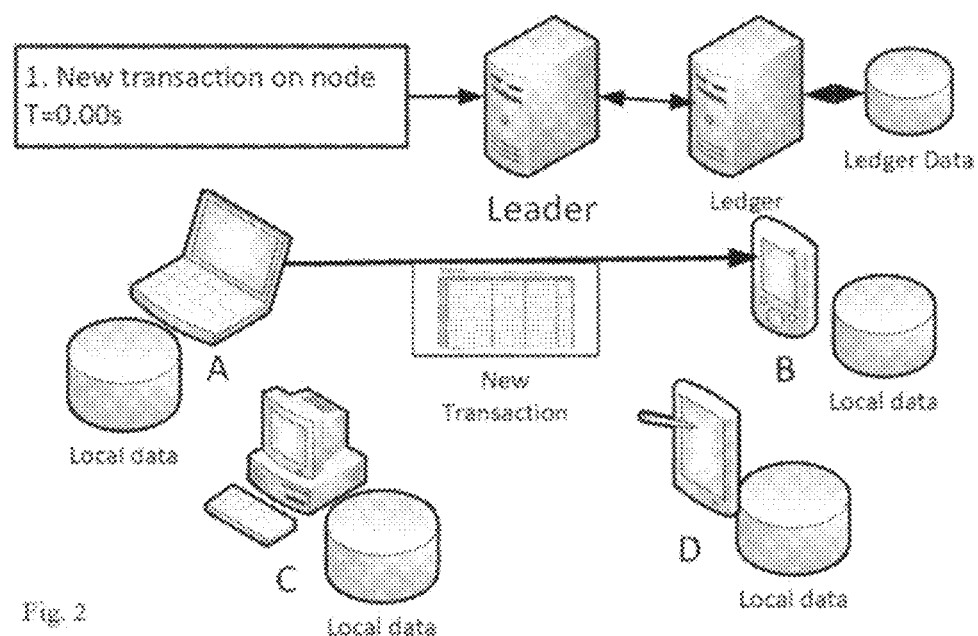
FIG. 2 is a schematic illustrating an information network disclosed in the present invention with the start of a new transaction.
Figure 3:
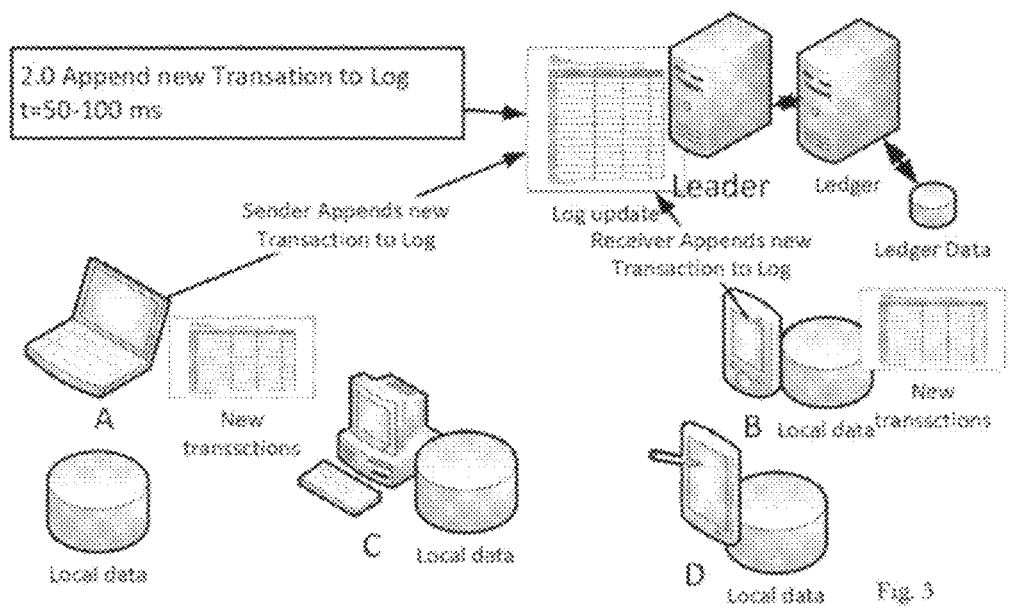
FIG. 3 is a chart representing communication within the operation of technology of the present invention referred to as Aurigraph in a Decentralized DLT Ecosystem where a new transaction is appended.
Figure 4:
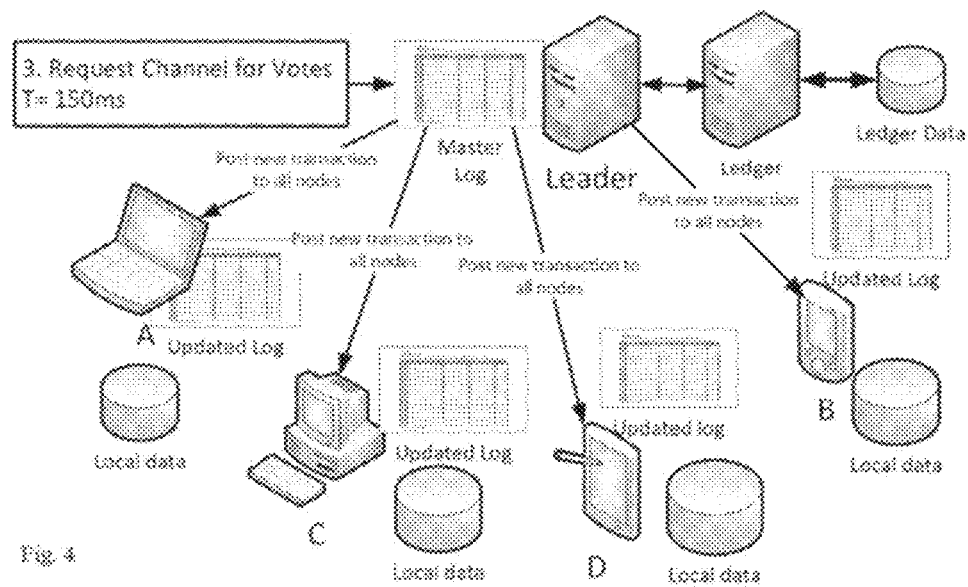
FIG. 4 shows a request in the channel for consensus of votes.
Figure 5:
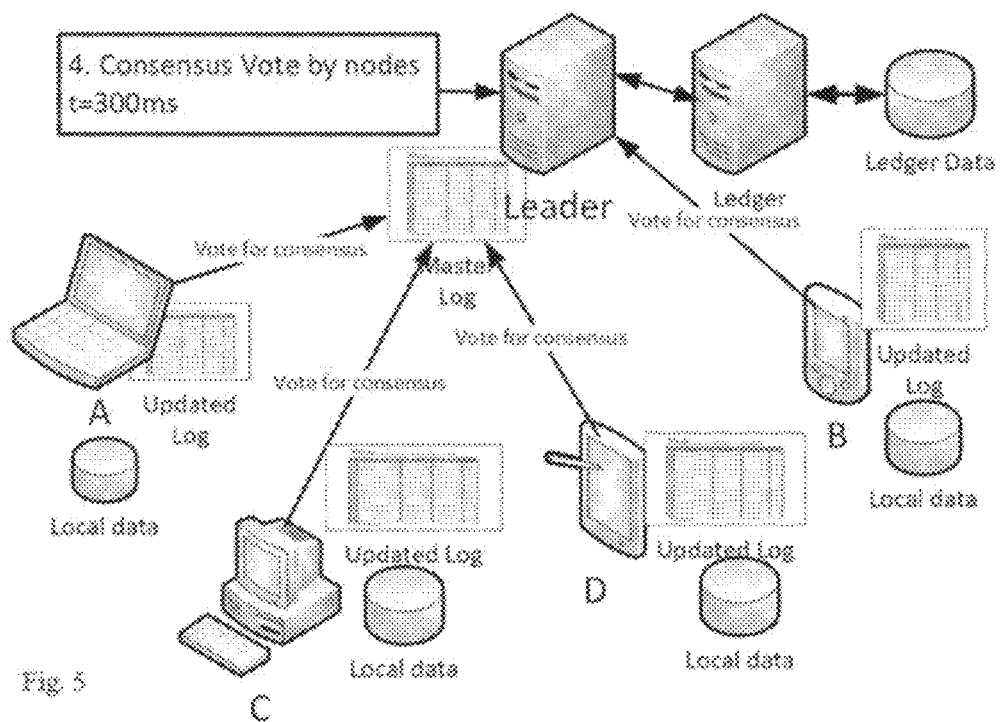
FIG. 5 shows consensus votes by respective engaged nodes.
Figure 6:
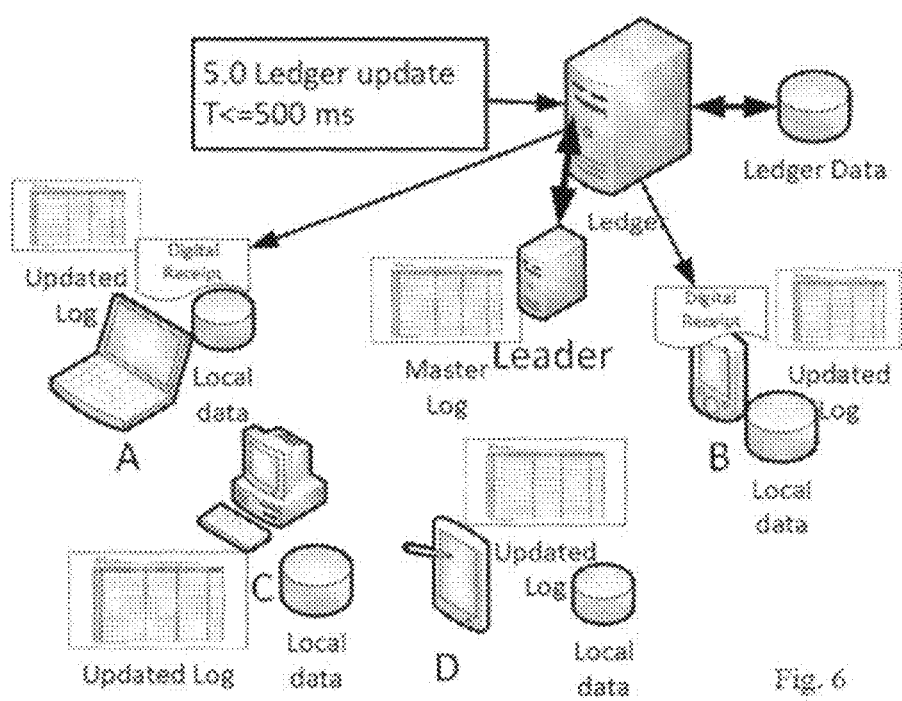
FIG. 6 shows the ledger as it is being updated.
Figure 7:
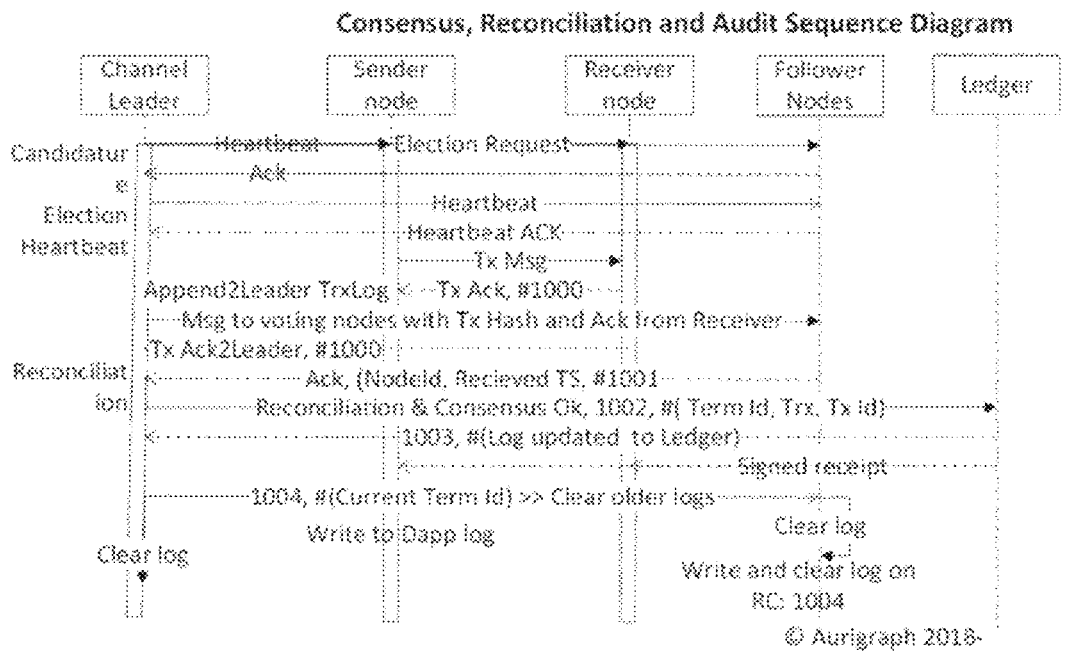
FIG. 7 shows a sequence of referencing for consensus.
Figure 8:
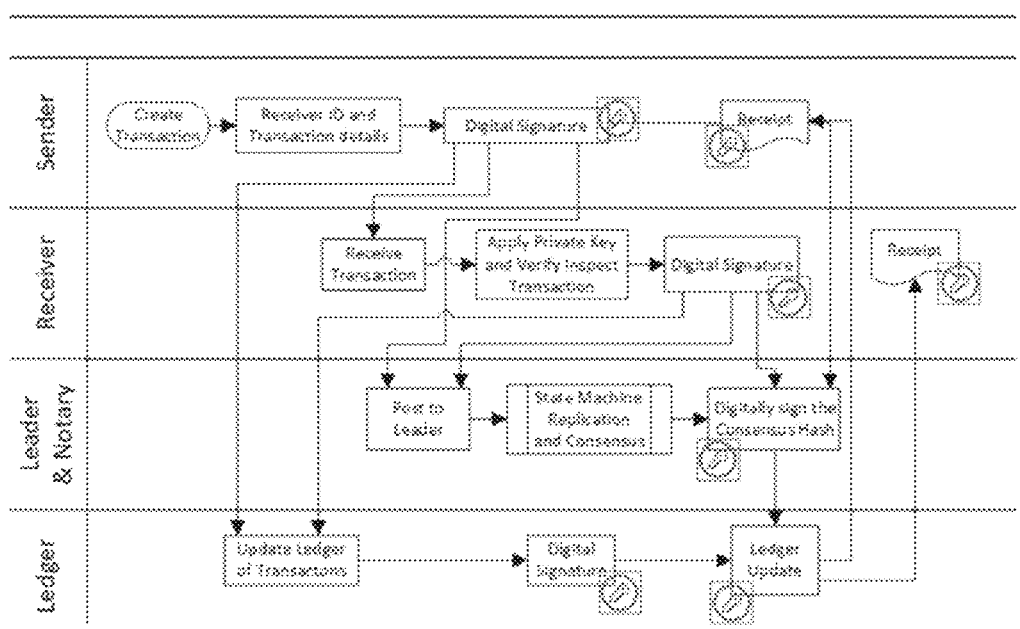
FIG. 8 shows a diagram illustrating Aurigraph™ bookkeeping with real-time reconciliation and audit.

As shown in FIG. 2, information provided by a user information record is stored in a database, such information including the user's personal information, records, personally identifiable information such as driver's license, age, location of domicile and government identification.

According to this embodiment of the invention, a user will enter via the internet or a wireless device his or her information requester, based on phone number, name, t/or date of birth and this information will be held in a secure database available for future reference. According to another embodiment of the invention, the network will track in a database, all users are members of the decentralized network of the particular DApp and able to communicate with one another on a Peer-to-peer model.

The invention provides novel Distributed Ledger methods designed to monitor and respond to events that can occur in user DApps, the invention can provide a device configured for contact or functional access to the human body or another device or machine. The system can even be incorporated into or combined with sensing systems.

The device may be configured to either transmit (immediately or upon a timed or signaled delay at the end of specific events or time periods) or store sensed data relating to the at least one message or parameter. The sensed data may be stored in an erasable memory on the device itself, the device itself may have or be in communication with a data storage device (e.g., flash drive, disk, hard drive, tape, and the like) which can then be downloaded onto a portable memory device, and can be transmitted to or carried to the computer/processor which is a core element in the operation of this system.

A communication network is configured to receive and transmit the sensed data relating to at least message or parameter either by hardwired or wireless communication with the sensor or physical receipt of a memory storage device containing the stored data. The communication network may be a wireless system directly or indirectly from the memory associated with and receiving sensed data from the device and may include a port into which permanent memory may be transmitted or a temporary memory device (e.g., flash drive) may be inserted (e.g., a USB port) to transfer from the memory device or the original sensed data source to the computer/processor.

A processor may be in communication with the communication network and configured to receive and store in memory transmitted sensed data relating to message or parameter. The data may be received and stored as raw data or raw signals and converted by software into actual values that may be displayed, printed and read by a user. For example, blood pressure data may be originally transmitted in digital form, wherein the processor receives and converts the raw digital data into displayable and readable data such as 120/80. Alternatively, the sensor may itself be capable of transmitting the data as readable, displayable and printable information by having a microprocessor or digital-to-analog converting component (e.g., field programmable gated array—FPGA, or application specific integrated circuit—ASIC) in the sensor or between the sensor and the computer.

The processor is configured to compare the transmitted sensed data relating to the message or parameter to a reference table stored in memory, the table indicating ranges of normal, borderline and abnormal values with respect to the transmitted sensed data The reference tables can be standard tables available in a generically programmed computer for the system, and/or may be a reference table or tables configured for specific users or for specific category of users.

The processor may have at least one response in memory for providing at least one corrective response to at least one abnormal value of the transmitted sensed data relating to at least one parameter. The responses can include direct changes in a particular status or a message generated through a sensor or a manually entered.

The parameters that are detected by the device can be processed and/or displayed immediately to the users, or to the local computer, and alerts displayed when required The information can also be wirelessly transmitted to the user's smart phone or computer, or the smart phone or computer of the other stake holders, for storage or analysis, or transferred from a port on the monitoring module device to a flash drive or other storage medium. In a particularly preferred embodiment of the invention, a smart phone is used as a gateway to relay data to a remote database via the mobile network, which provide real-time analytics that enable wireless communications among mobile users in an easy, secure and efficient manner. In another preferred embodiment of the invention, the device software provides the user with an easy-to-use graphical user interface on their smart phone that uses the standard navigation buttons on mobile devices. The information can also be electronically transmitted to the network in which the user is registered.

The device also preferably inputs specific conditions and history that have been identified the recorded information can be summarized and displayed for the user and users can be tracked, in order to encourage compliance with a prescribed protocol that has been identified for sensed parameters or conditions that warrant or require a response through a SmartContract.

The data can be viewed in real time or logged based on the activities, or as averages, or graphic displays. The device may also be embedded in existing monitoring systems, audio systems and the like which are already worn in public. For example, the device may be embedded in an iPod® music storage system or an iPod® system case. It may also be as unobtrusive as a wristband (appearing as if it were a watch), GPS golf monitoring watch, tendon support device, and the like.

In addition to providing a record and display of parameters, the device according to the invention is also useful in monitoring deviations In another preferred embodiment of the present invention, the device provides a personalized journal separate from records being maintained In a particularly preferred embodiment of the invention, the device can record the events and data of use to the user The wireless feature of the device allows monitoring of user activity remotely in a variety of settings. The wireless feature with indicators also permits the user to be alerted or instructed in accordance with a protocol In one preferred embodiment of the invention, the testing and measuring instruments and the control devices are connected via a local area network with a data controller, wherein all the vital information obtained in the system is stored. Instruments and devices are permitted to access the controller through the network to retrieve necessary vital information. In another preferred embodiment arranged in the distributed network configuration, the vital information obtained by respective measuring instruments is stored therein.

In one embodiment of the invention, the wireless network includes a satellite system. Internet includes but is not limited to intranets, local area networks and wide area networks. Computers include but are not limited to personal computers, stand-alone computers, tower computers, servers, desktop computers, laptop computers, notebook computers, personal digital assistants, work stations, main frames, minicomputers, supercomputers and wearable computers. Computer can also be a special purpose computer programmed to perform the disclosed algorithms. Wireless device includes but is not limited to cell phones, personal digital assistants, wireless Internet cards, wireless modems and smart cards. Databases include but are not limited to relational databases, object databases, NOSQL and post-relational databases. According to one embodiment of the invention, a computer and a database can be coupled together via an Ethernet connection that can be placed in a location such as but not limited to a government facility, a private company facility, a clinic, a vehicle or the like.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

A method of executing, confirming and storing a transaction in a serverless decentralized node network comprising a number N of active nodes of at least five active nodes in the absence of a centralized storage server, the network enabling peer-to-peer consensus of a transaction includes:

a candidate node (one of numerous active nodes that is automatically acting in a communicating capacity within the network), from among the active nodes that communicates into the system and is selected upon a contemporary time-available basis to become a leader node in a single peer-to-peer, node-to-node transaction, outputting a pulse into the network to obtain validation by a confirmation level of majority of the nodes, and being identified as the leader node for the single peer-to-peer transaction.

The candidate node can be chosen randomly from among all nodes active in the system, active nodes engaged in the specific transaction, the initiating node, the first receiving node entering into the system, or may be further differentiated and accepted based upon the power of the node (differentiating among smart phones, less desirable, pads, notebooks, laptops, MACs, PCs, processors dedicated to the DLT system and mainframes.

Software and DApps to be executed through communications with the present DLT system may be stored within the system, and/or stored on all nodes in a DLT system dedicated to the output more in personal control. Even though the system is likely more secure than most personal or business-stored information, there is always some group that is resistant to cloud or DLT technology and wish to maintain an illusion of personal control.

A transaction-initiating node in the network shares transaction details for initiating the peer-to-peer transaction to a second node, and the second node when receiving the initiated peer-to-peer transaction through the network acknowledging the initiated transaction.

The first hash and the second hash are transmitted to and received by the leader node, which is a node other than first node and the second node. The leader node, active in a machine state, multicasts the node-to-node transaction hash to all active nodes in the network. One issue that has persisted in on-line transactions is the problem of a "duplication of transaction." Where there is any significant time delay, as in blockchains or other transactions where there must be an approval with a measurable time delay. In the finite interval between issuing a transaction and resolution, the original issuance may be directed or misdirected towards to a different or multiple recipient. If the additional recipient accepts the transaction before verification, one of the participants will be defrauded of goods or value in the transaction. Each active node in the network responding to receipt of the multicast by sending individual unique hash acknowledgements to the leader node. The Leader Node needs to receive at least Majority (>51%) acknowledgements from the nodes comparing hashes received to confirm an absence of duplication of the transaction. Each of the follower nodes transmits confirmation of the absence of duplication of the transaction to the leader node.

The average time for completion of the transaction between identification of the leader node while follower nodes are active and each of the follower nodes transmitting confirmation of the absence of duplication of the transaction to the leader node is less than 5.0 seconds. This average time assumes that the required N number of active nodes, and therefore Majority (>51%) of nodes are active and can respond.

The actual time for completion of the transaction between identification of the leader node while the required N number of nodes and therefore the Majority (>51%) nodes are active and each of the follower nodes transmitting confirmation of the absence of duplication of the transaction to the leader node is less than 5.0 seconds, even less than 2.0 seconds, less than 1.0 seconds, less than 750 milliseconds and even less than 500 milliseconds. A present lower limit depends primarily on available nodes, bandwidth and computing power but could be as low as 1 millisecond.

The Consensus confirmation level is programmable so that in consideration of the required level of consensus or confirmation of at least Majority (>51% of active)nodes can be adjusted by an administrator of the network to whatever levels Majority (>51%) the DApp channel Administrator feels the transaction requires, such as more than 55%, more than 60%, more than 65%, more than 70% up to any functionally reasonable level such as 90%.

Distributed Ledger Reconciliation is another aspect of business that takes a lot of time and effort especially when it involves multiple ledger entries, their reconciliation at the end of a business day and subsequent audit, at the end of a month, quarter or year. If a reconciliation is missed at the end of a day involving a transaction spread across multiple days or weeks, it is likely to be only reconciled and audited when ever the audit is conducted. This can cause wide variance in reconciliation with the risk of fraud.

The method may be used where the transaction is a transaction between nodes operated by a facility

TABLE 3

| KEY AURIGRAPH DISTRIBUTED LEDGER FEATURES | |
|---|---|
| PERFORMANCE | Mining-less: zero cost of transactions<br>Application Layer Atomic Multicast protocol<br>& consensus algorithm replicates transactions within network for consensus by active nodes<br><300 ms<br>>100,000 TPS per network partition<br>>150 Mbps throughput per node |
| LATENCY | Fastest response time for a decentralized platform with true BFT Mining-less platform maintains true event time stamp on platform Log size, ledger update interval, and consensus level are configurable for each channel |
| LEDGER ATOMICITY | Event/transactions ordered by time stamp on ledger in chronological order of occurrence & replicated in same order for consensus after which the data are updated to ledger in <500 ms System is resistant to cyberattack<br>Microservice architecture achieves Byzantine Fault Tolerance (BFT) with immutable ledger update under 500 ms |
| CONSENSUS & SECURITY | End-to-end post-quantum cryptography (PQC) for data & transport layer security Secure distributed consensus - BFT |
| D-APPS | Node supports multiple DApps:<br>Multi-sig, multi-currency wallet<br>Top 10 crypto currencies<br>Smart contracts<br>Application level P2P communication & consensus for 3$^{rd}$ party apps<br>IPFS client for P2P hypermedia-based file system |
| DECENTRALIZED SEARCH | Indexed content in nodes when file added Search can be monetized |

TABLE 3-continued

| KEY AURIGRAPH DISTRIBUTED LEDGER FEATURES | |
|---|---|

TABLE 4

| COMPARISON OF BLOCKCHAIN vs DAG vs AURIGRAPH DLT | | | |
|---|---|---|---|
| FEATURE | BLOCKCHAIN | DAG | AURIGRAPH DLT |
| MINING | Required for transaction validation Expensive | Mining-less | Mining-less |
| TRANSACTION THROUGHPUT | Low - 1-13 TPS | High - 180-100,000 TPS | Very high >100,000 TPS <2000 ms latency |
| SECURITY | Low & Unreliable Double Spend 51% Fraud | High - Multiple confirmations increase reliability | Very high End-to-end quantum cryptographic security |
| TRANSACTION FEE | High Does not support micro transactions | Low Can be used in IOT applications | Near zero Transaction costs enable micro & nano transactions |
| SCALABILTY | Low due to mining Sharing/segwit/ forking does not solve problem | Expected to solve scalability problems | Highly scalable |

A further aspect of the invention is to use AI predictive analytics and secure blockchain technology to generate electronic data interchanges and expedited payments to providers.

A further aspect of the invention is to provide a blockchain information delivery and management platform that enables secures supply chain management for prescription.

Further summary includes the fact that embodiments enable a protocol and system operatively connected with a decentralized network of nodes and distributed ledger for validation of a confidential Message or Transaction. The system receives an information record, wherein the record comprises transaction data indicating a sender, a receiver and an information record between the two; the Hash of the Message between the sender and the receiver is then shared within a secure network of devices to obtain consensus by other active nodes voting, determined by randomly elected network leader which determines if majority of nodes have consensus on message/transaction, share Transaction receipt to sender, receiver from the Distributed Ledger for transparency, immutability, reconciliation and notarized audit allowing transactions to be proposed, accepted, notarized and stored by a trust-less third-party. The distributed ledger system can avoid expensive computational resources needed to redundantly verify transactions and store evidence on multiple nodes of a distributed ledger while it reconciles multiple ledgers and issues receipts to participating nodes of the network.

In complex transactions involving multiple stakeholders involving a single transaction reflected over multiple ledgers, such as in healthcare, finance or supply chain, the transaction details need to flow from one stakeholder to the next with each leg of the transaction seeking consensus and receiving a receipt before moving on to the next leg of the transaction. The invention claims to be able to complete such multi-party transactions with real-time reconciliation and audit in a period of under 30 seconds with immediate settlements, doing away with the present system of reconciliation of each leg of the transaction between two stakeholders at the end of each business day, thus completing the settlement of a given transaction over multiple days across the system. Such systems also require addition effort and cost to complete the audit of each leg of the transaction, especially in high volume transactions.

In transactions involving multiple legs across multiple ledgers, the originator of the transaction may often not have visibility of till the last leg of the transaction until the audits for each phase are completed.

The invention claimed is:

1. A method for executing, confirming and storing a transaction between a sender node and a receiver node in a serverless distributed ledger by a decentralized node network comprising at least five active nodes, the method comprising:
   selecting a leader node from the active nodes of the decentralized node network other than the sender node and the receiver node;
   initiating the transaction between the sender node and the receiver node;
   encrypting one or more details of the transaction, and transmitting the encrypted details of the transaction by way of the sender node to the receiver node;
   generating a first hash by way of the sender node and a second hash by way of the receiver node, and transmitting the first hash and the second hash to the leader node;
   validating the transaction between the sender node and the receiver node, by comparing the first hash and the second hash by way of the leader node;
   replicating the transaction by state machine replication to generate a new transaction log, and transmitting the new transaction log to a number of follower nodes of the decentralized node network by way of the leader node, wherein
   each active node in the decentralized node network responds to receipt of the new transaction log by sending individual unique hash as acknowledgement to the leader node to form of consensus to the transactions, and
   after the consensus to the transaction is obtained, the leader node posts the transaction to the distributed ledger, with digital signatures of the sender node, receiver node and the leader node, to ensure immutability;
   receiving confirmation of the transaction from the follower nodes, in response to the new transaction log transmitted by the leader node; and
   updating the transaction in the distributed ledger, upon receiving a confirmation from at least a majority of the follower nodes; wherein,
   the leader node is randomly selected from the active nodes of the decentralized node network using a multicast network protocol other than the sender node and the receiver node,
   the follower nodes are the active nodes of the decentralized node network other than the sender node, the receiver node and the leader node, and
   the active nodes are a plurality of independent computer devices configured to record, share and synchronize the transaction in the respective serverless distributed ledger.

2. The method of claim 1, wherein the receiver node approves the initiated transaction with an acknowledgement, based on decryption of the encrypted details of the transaction using the key.

3. The method of claim 1, wherein the at least majority of active nodes confirm an absence of duplication of the transaction and transmit confirmation of the absence of duplication of the transaction to the leader node in the form of individual hash values.

4. The method of claim 1, wherein an average time for completion of the transaction between selecting the leader node and updating the updating the transaction in the distributed ledger is less than 5.0 seconds.

5. The method of claim 1, wherein the majority of active nodes may be adjusted to more than 51% of the active nodes of the decentralized node network by an administrator of the decentralized node network.

6. The method of claim 1, wherein the distributed ledger sends digitally signed and encrypted receipts of the transaction to the sender node and receiver node, such that the sender node and receiver node (i) decrypt the digitally signed and encrypted receipts of the transaction and extract the transaction details; and (ii) update individual ledgers corresponding to the sender node and the receiver node to complete the audit in real-time, to complete the transaction processing in less than 30 seconds.

7. A decentralized node network for executing, confirming and storing a transaction between a sender node and a receiver node in a serverless distributed ledger, the decentralized node network comprising at least five active nodes, and configured to:
   select a leader node from the active nodes of the decentralized node network other than the sender node and the receiver node;
   initiate the transaction between the sender node and the receiver node;
   encrypt one or more details of the transaction, and transmit the encrypted details of the transaction by way of the sender node to the receiver node;
   generate a first hash by the sender node and a second hash by the receiver node, and transmit the first hash and the second hash to the leader node;
   validate the transaction between the sender node and the receiver node, by comparing the first hash and the second hash by way of the leader node;
   replicate the transaction by state machine replication to generate new transaction logs, and transmit the new transaction logs to a number of follower nodes of the decentralized node network by way of the leader node, wherein
   the leader node is randomly selected from the active nodes of the decentralized node network using a multicast network protocol other than the sender node and the receiver node,
   each active node in the decentralized node network responds to receipt of the new transaction log by sending individual unique hash as acknowledgement to the leader node to form of consensus to the transactions, and
   after the consensus to the transaction is obtained, the leader node posts the transaction to the distributed ledger, with digital signatures of the sender node, receiver node and the leader node, to ensure immutability;
   receive confirmation of the transaction from the follower nodes, in response to the new transaction logs transmitted by the leader node; and update the transaction in the distributed ledger, upon receiving a confirmation from at least a majority of the follower nodes;

wherein, the follower nodes are the active nodes of the decentralized node network other than the sender node, the receiver node and the leader node, and the active nodes are a plurality of independent computer devices configured to record, share and synchronize the transaction in the respective serverless distributed ledger.

8. The decentralized node network of claim 7, wherein, the receiver node approves the transaction with an acknowledgement, based on decryption of the encrypted details of the transaction using the key.

9. The decentralized node network of claim 7, wherein the at least majority of active nodes confirm an absence of duplication of the transaction and transmit confirmation of the absence of duplication of the transaction to the leader node in the form of individual hash values.

10. The decentralized node network of claim 7, wherein an average time for completion of the transaction between selecting the leader node to updating the updating the transaction in the distributed ledger is less than 5.0 seconds.

11. The decentralized node network of claim 7, wherein the majority of active nodes may be adjusted to more than 51% of the active nodes of the decentralized node network, by an administrator of the decentralized node network.

12. The decentralized node network of claim 7, wherein a user's name, credentials and message are hashed and included at least in the first hash.

13. The decentralized node network of claim 7, wherein the distributed ledger, sends out digitally signed and encrypted receipts of the transaction to the sender node and the receiver node, to complete a reconciliation and provide an evidence of the transaction, to complete an audit of the transaction.

14. The decentralized node network of claim 13 wherein, upon receiving the digitally signed and encrypted receipts, the sender node and the receiver node: (i) decrypt and extract the transaction details; and update individual ledgers corresponding to the sender node and the receiver node to complete the audit in real-time and thus complete the transaction processing.

* * * * *